United States Patent

[11] 3,555,244

[72] Inventors Siegfried Spauszus,
 Villingen, Schwarzwald,
 Wolfgang Kohler, Alzenau, in unter
 Franken, Herbert Blieske, Frankfurt am
 Main, and Klaus-Peter Vetter, Bad Soden,
 Taunus, Germany
[21] Appl. No. 601,018
[22] Filed Dec. 12, 1966
[45] Patented Jan. 12, 1971
[73] Assignee Kienzle Apparate G.m.b.H.
 Villingen, Black Forest, Germany
[32] Priority Dec. 14, 1965
[33] Switzerland
[31] 17206/65

[54] METHOD AND APPARATUS FOR THE AUTOMATIC EVALUATION OF A BAR GRAPH RECORD
16 Claims, 15 Drawing Figs.
[52] U.S. Cl. .................................................. 235/61.6,
 250/219
[51] Int. Cl. ....................................................... G06f 7/38,
 G06k 11/00, G01n 21/30
[50] Field of Search ............................................ 235/61.6A,
 61.6B; 250/219a, 219dd

[56] References Cited
UNITED STATES PATENTS
3,226,532 12/1965 Gordon et al. ............... 235/61.6(A)UX
3,327,097 6/1967 Searcy et al. .................. 235/61.6(A)

Primary Examiner—Daryl W. Cook
Attorney—Michael S. Striker

ABSTRACT: A bar graph having different bar widths corresponding to different operating conditions is scanned in the direction of the bar widths. Pulses are generated having pulse widths corresponding to the width of the graph. The number of pulses of each pulse width occurring during the recording time is counted and each of these numbers is printed out furnishing a record corresponding to the amount of time each operating condition occurred during the recording time.

METHOD AND APPARATUS FOR THE AUTOMATIC EVALUATION OF A BAR GRAPH RECORD

The invention pertains to a method and apparatus for the automatic evaluation of the recording period of a bar graph record which includes several graphs having different recording widths and which are recorded on a record carrier.

In previous applications of this type, an operations recorder, set into a vehicle serves to provide not only but also a strictly time related operational in the form of a bar graph diagram. Operating and rest periods of machinery may also be recorded by means of special recording apparatus in the form of such bar graphs. Generally, such a bar graph is obtained by the use of a recording apparatus, driven by means of an oscillating mass or directly by means of a rotating shaft and which is limited in its amplitude in accordance with the desired recording width and wherein the recording bars are so closely crowded together that they give the impression of a wide uninterrupted recording track in the direction of the motion of the record carrier. Such a bar graph record has the great advantage that working and rest periods, for instance stop and go periods of a vehicle may at once be recognized at least in respect to their order of magnitude to a time scale provided on the record carrier, a simple preliminary evaluation of the record being made possible thereby. It is often required, however, that the record not only show whether operation or driving has taken place, but also who has been working or driving, which motor had been put into operation, etc. These conditions may be generally obtained by providing for a variety of different recording widths. The evaluation, however, of these individual recording periods, such as the recognition as to which driver had been driving how long, will be made much more difficult thereby.

In accordance with the evaluation procedures known heretofore, the record would at first be enlarged and the recording periods measured with relation to the time scale provided therewith. This work requires a considerable personal effort. Furthermore, subjective readout errors may not always be avoided. Another known, automatically acting arrangement acts to scan by photoelectric means the record carrier in the direction of its motion in respect to excess of a given maximum value and which adds the values readout thereby in a counting apparatus. This procedure however is not suitable for the evaluation of a record using a bar graph record only.

It is an object of the present invention therefore to provide a method and an automatic apparatus by means of which the evaluation of the recording period may be obtained from a bar graph diagram which is considerably faster compared to the known procedures, which avoids subjective errors, and at the same time provides a printed record for purposes of salary or the like.

The solution of this task in accordance with the invention is provided by a photoelectric arrangement, periodically scanning the bar graph diagram with a given frequency at right angles to the motion of the record carrier, thereby furnishing pulses of varying duration (width signals) in accordance with the width of the graph record. These pulses control the distribution of special counting of special pulses, the overall sum of which represent the actual record in period, into several output storage circuits respectively associated with the various recording widths and the contents of which may be read out by means of counters or printer mechanisms.

Two possibilities in accordance with the invention are available for the purpose of width recognition wherein a photoelectric arrangement is followed by electronic evaluation circuits:

For an exact width determination,
1. The width signals, obtained from an optical scanning head, are counted out by means of pulses of a higher frequency.
2. A tolerance range with respect to time is coordinated for each of the width signals, that is for each recording width, the range being provided by two timing circuits having different pulse durations.

The novel features characteristic of this invention are set forth in the appended claims. The invention itself together with further advantages and objects thereof may best be understood by reference to the following description taken in connection with the appended drawings in which:

Figure 1:
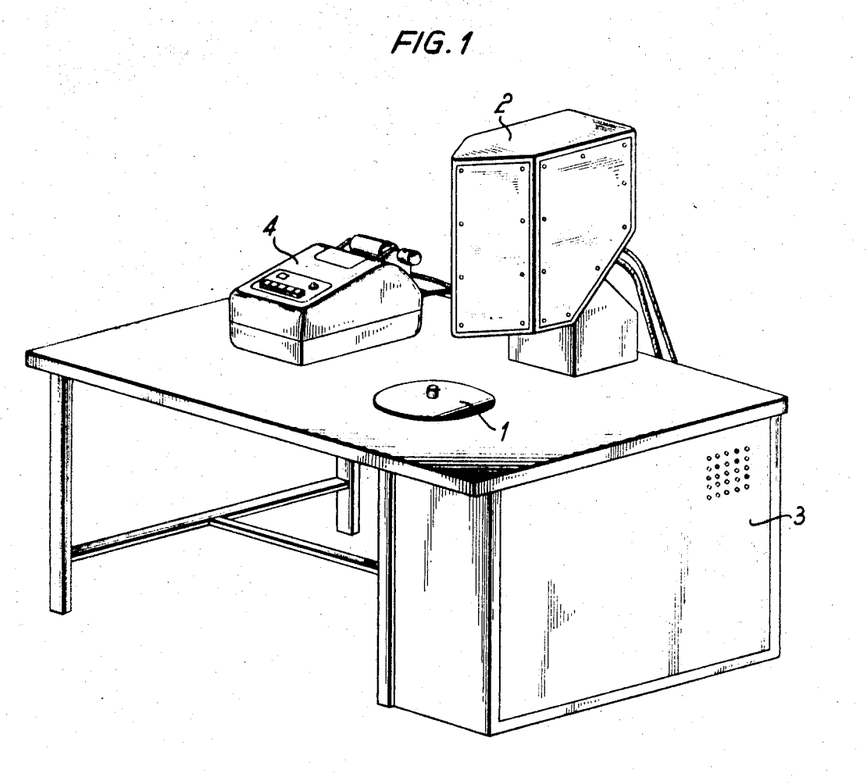
FIG. 1 is an overall view in perspective of the evaluation arrangement.
Figures 2, 3:
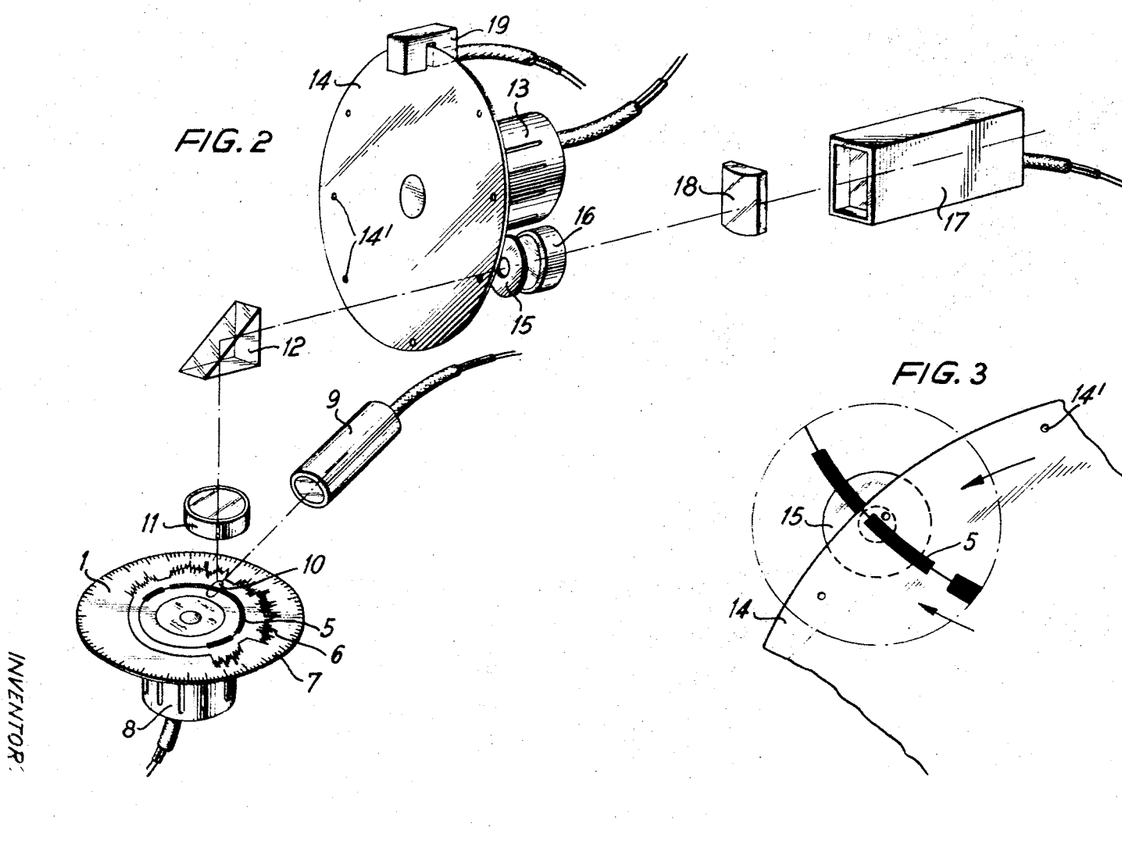
FIG. 2 illustrates the optical system of the scanning arrangement.
FIG. 3 shows the image of the record on the graph carrier disc as projected into the plane of an apertured disc.
Figures 6, 6D:
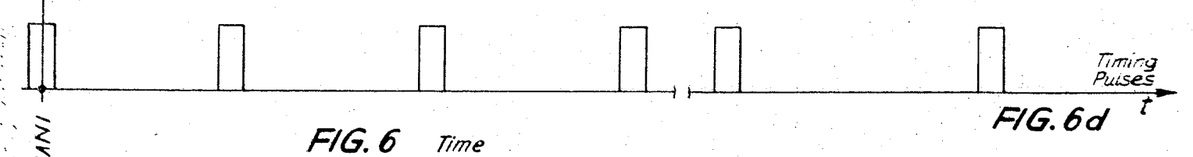
FIG. 6 illustrates the pulses as obtained from the optical scanning head.
FIG. 6d illustrates the timing pulses (minute counting pulses)
Figure 6A:
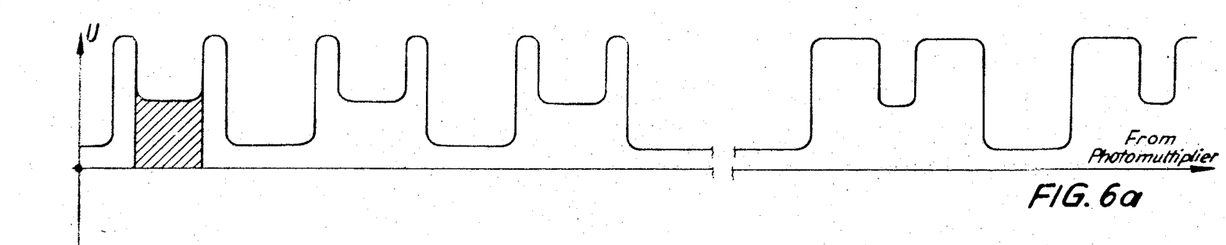
FIG. 6a shows the width signals.

In order to evaluate the graph recorded on the disc 1, the signals provided by an optical scanning head 2 are processed in an electronic evaluation arrangement 3, counted and transmitted to a printer 4 which provides a digital printout of the number of recording minutes which correspond to each of the various recorded graph widths. As shown in FIG. 2, the recording disc 1 upon which in addition to the bar graph record 5 which is to be evaluated, may include for instance a velocity record 6 and a timing scale 7. The record disc is driven by means of a synchronous motor 8 through a speed reduction gear system which is not shown in detail. An illumination arrangement 9 produces a light spot 10 (scanning field) on the record disc 1, the diameter of which is such that 11 possible tolerance ranges of the record receive equal illumination. An enlarged image of the scanning field, that is, of the bar graph diagram is projected by means of an objective lens 11 onto an apertured disc 14 through the reversing prism 12 which is driven by a second synchronous motor 13. A masking shutter 15 acts to limit the scanning field to such an extent that other recordings or imprints which lie outside of the record disc are not subject to scan. A second lens objective 16 which is disposed in the light path behind the shutter 15 forms an image of the aperture shutter of the first objective 11 on the light sensitive surface of the photoelectric multiplier 17. Planoconvex lenses 18 are additionally disposed in the light path for the purpose of a more complete utilization of the photo cathode of the photomultiplier. A series of apertures 14' in the apertured disc 14 is scanned by means of another photoelectric arrangement 19, producing timing impulses (FIG. 6d), which have a definite phase relationship to the width signals (FIG. 6a) as supplied by the photomultiplier 17.

Figure 4:
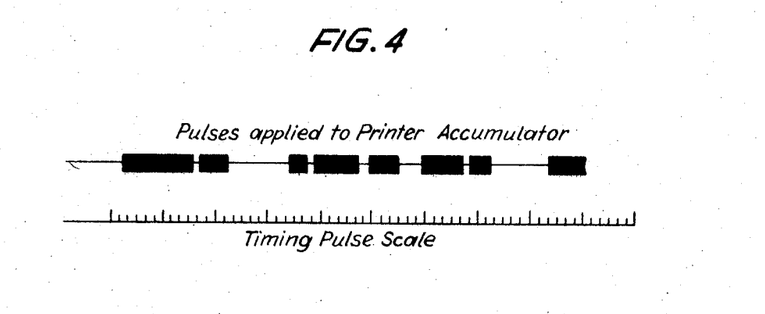
FIG. 4 illustrates a bar graph record enlargement with a time scale coordinated therewith.
Figure 5:
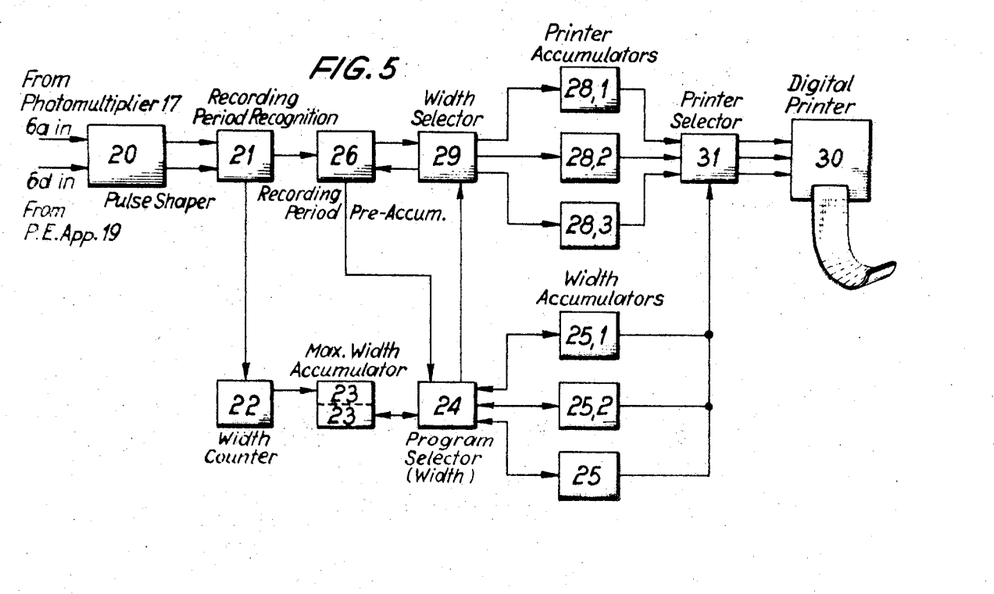
FIG. 5 is a block diagram schematic of the electrical evaluation arrangement for measuring the recording periods as such.
Figure 7:
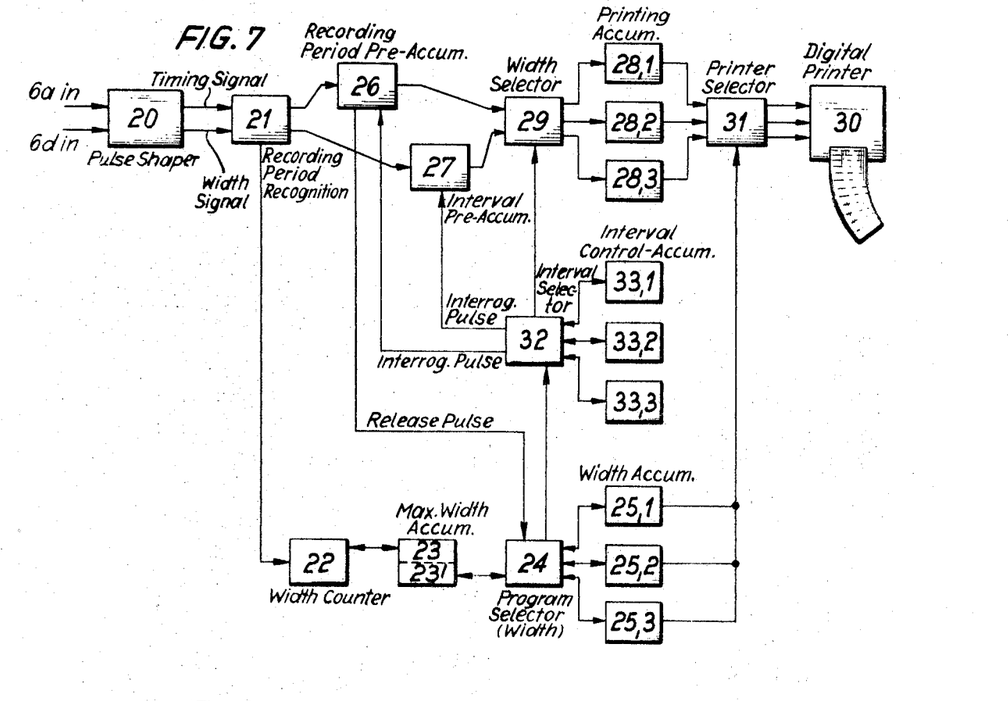
FIG. 7 is a block diagram of the electrical evaluation system together with an interval recognition arrangement.
Figure 8:
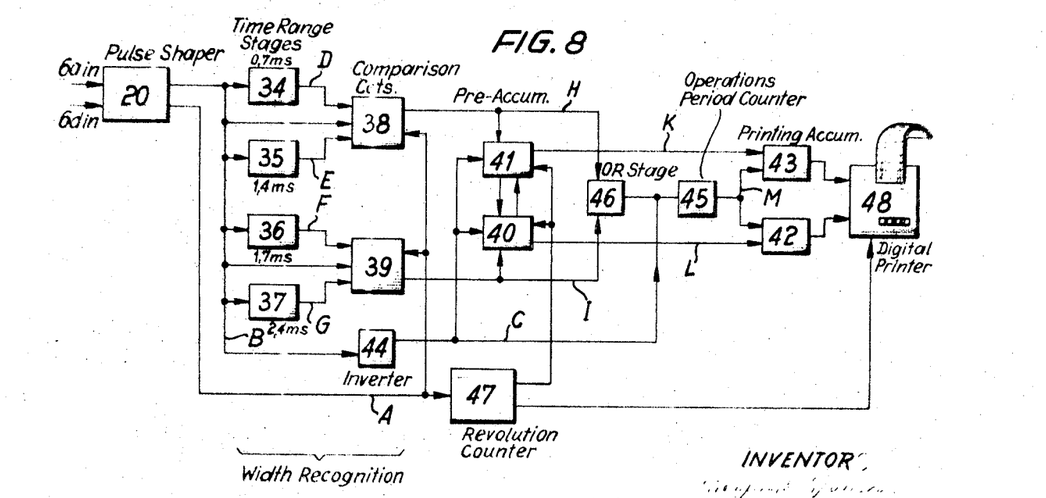
FIG. 8 is a block diagram of a circuit for processing of the signal for width recognition as proposed in the second solution.
Figure 10:
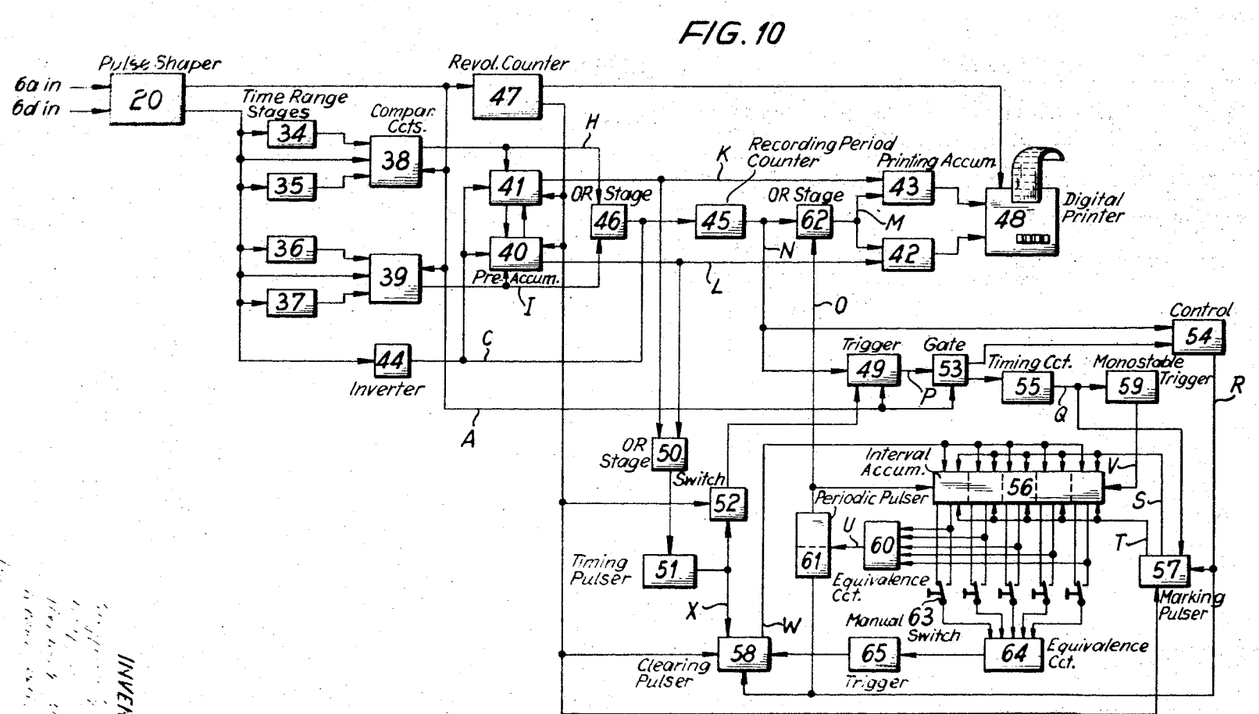
FIG. 10 is a block schematic circuit diagram for width recognition in accordance with the second solution including in addition apparatus for recognition of recording pauses.

Two possibilities are available for meeting the requirements for record evaluation as shown in the electronic evaluation circuit 3. In the systems shown in FIGS. 5 and 8, recording periods as such that is the periods during which a bar graph record has been made on the record carrier are measured. In FIGS. 7 and 10 this arrangement has been enlarged so that recording intermissions, which are smaller a predetermined time period, may additionally be determined as a part of the recording period. This, for instance, may be necessary when pauses occur during the recording of driving periods which the driver is obliged to observe due to traffic congestion, closed track barriers, stops, waiting periods due to traffic lights, and the like. (FIG. 4) If it be required that such a record should be evaluated not only in respect to the actual driving period, but also in respect to the overall working period, it will be understood, that such interruptions of the driving period must be counted as part of the working time. The electronic evaluation circuit as it is shown in FIG. 8 may, due to a special preliminary conditions, operate in accordance with a simplified principle and with very simple circuits. These conditions include maintaining an especially precise tolerance range in the recording width of the bar graph and the determination of only two different recording widths, the tolerance ranges of which must not overlap each other.

The modified arrangement in accordance with FIG. 7 will be made the basis for describing the electronic evaluation circuit 3.

Pulses derived by the two arrangements included in the optical scanning head, that is, by the photoelectric apparatus 19 and the photomultiplier 17, representing timing and width impulses are applied to the coupling circuit 20. Further processing of the pulses, shaped in the coupling circuit 20, takes place in the recording period recognition circuit 21 and in the width counter 22 in circuit therewith. A maximum width accumulator circuit 23 is connected to the width counter 22, the contents of both of which is respectively transferred through a selector circuit (width control) 24 to the width storage circuit 25 corresponding to the respective recording width. The record period counting pulses (in this case the timing impulses are used) are transmitted from the recording period recognition circuit 21 either into the recording period prestorage circuit 26 or into an interval (i.e. pause) prestorage circuit 27. The transfer of the content of these two storage circuits into one of the printer storage circuits 28 is controlled by means of one of the width selector switches 29 which are under the control of the width storage state 25. It is of course understood that a corresponding printing storage circuit 28.1, 28.2, or 28.3 and a width storage circuit 25.1, 25.2, 25.3, is provided for each of the recording widths. In order to obtain the relative coordination between the individual recording widths and the respective printing columns, a printing coordinator or selector 31 is disposed between the printing storage 28 and the digital printer 30, serving to provide the proper coordination based on the content of the width storage circuit 25. The interval selector 32 acts to effect the transfer of interval periods from the interval prestorage 27 into the printing storage 28 on the basis of the output of the interval control storage circuits 33.1, 33.2, and 33.3. As shown for the signal processing circuit in FIG. 8, the width signals derived from the coupling circuit 20 are applied to four timing circuits 34, 35, 36 and 37, and the output signal pulses of these four timing circuits are compared together with the width signals in the comparison circuits 38 and 39. Prestorage circuits 40 and 41 are respectively connected in series with the comparison circuit 38 and 39 and act to prepulse printing storage circuits 42 and 43. The counting pulses for the driving period are produced by the trigger circuit 45 connected with the comparison circuits 38 and 39 by way of an OR stage 46. In addition, there is provided a inversion stage 44 which forms a negative width signal from the positive width signal. The multistage revolution counter 47 counts the timing pulses and produces, after attaining a definite counting value, for instance after one revolution of the record disc, a starting signal for the interrogation process of the digital printer 48. The description of the apparatus of FIG. 10 particularly in respect to recognition of the intervals, will be given later in connection with the description of its operation.

The method for the automatic determination of recording periods as derived from a bar graph record consisting of several different recording widths in accordance with the present invention will now be explained in further detail:

As already apparent from the description of the apparatus, the record disc 1 is continuously driven by a synchronous motor 8 through the medium of a speed reduction gear. The illumination arrangement 9 defines the scanning field 10 on the record disc and the lens 11 acts to project into the plane of the apertured disc 14 an enlarged image 5' of the bar graph entering into the scanned field. This image is scanned by means of the apertures 14' of the apertured disc 14 at right angles to its movement, that is at right angles to the motion of the record carrier, thus providing a scanning frequency based on the number of revolutions of the synchronous motor 13 and the number of the apertures 14' of the apertured disc 14. In this connection it is advantageous to coordinate the number of revolutions of the record disc 1 with that of the scanning frequency so that, for instance, during each recording minute, the bar graph is scanned once. As soon as a scanning aperture 14' enters into the range which is not excluded by the shutter 15, the lens 16 and the cylinder lens 18 produce a light impulse on the light sensitive surface of the photomultiplier 17. Should this aperture go past the darker graph record track, the photopotential will decrease accordingly for as along as the aperture remains over the record track. Thereafter, the photopotential increases again to its original illuminated value and will then decrease again to its dark value as the aperture 14' goes past the range of the shutter 15.

Figure 6B:
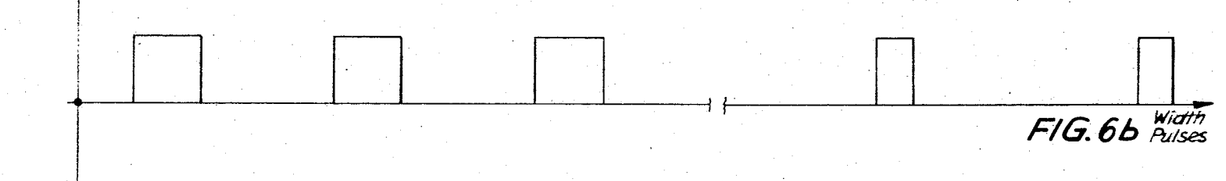
FIG. 6b shows the width signals as further shaped through the coupling circuit.
Figure 6C:
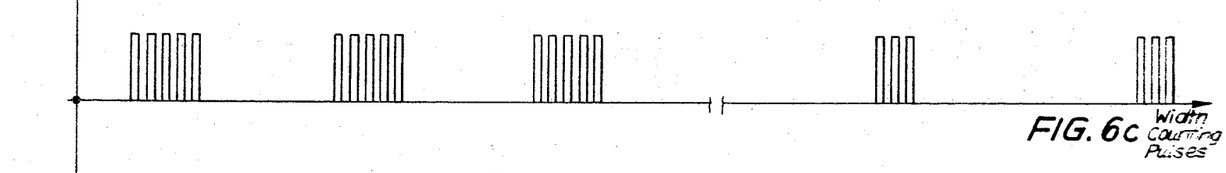
FIG. 6c shows the pulses for recognition of the width values.

The pulses (FIG. 6a) provided by the photomultiplier 17 are processed in the coupling circuit 20 so that only the impulse portion corresponding to the darker record track appears in the output as an absolute measure for the scanned record track and is applied as a width signal (FIG. 6b) to the recording period recognition circuit 21. Should there be no bar graph record on the record carrier but only a record corresponding to a rest position, these width signals will not be available. In addition, timing impulses (minute impulses) as obtained from the optical scanning head 2 through the photoelectric apparatus 19, are applied to the recording period recognition circuit 21 and are used for a countout of the recording periods. These impulses have a fixed phase relationship to the width signals.

It is the purpose of the recording period recognition circuit 21 to determine whether the incoming width signals have been produced by the scan of the bar graph record or by scanning of the rest position line, normally produced by the recording apparatus when at rest. The width signals, for this purpose, are counted out by means of a high frequency oscillator signal. Each individual width signal is hereby made up by means of a predetermined number of width recognition pulses. They are counted in a counting chain, and. upon exceeding a predetermined minimum impulse number, which simultaneously with the width signals produced by the optical scanning head 2 are introduced into the recording period prestorage circuit 26. The timing impulses are stored in the interval prestorage circuit 27 if this minimum pulse number is not attained. For the purpose of a comparative numerical example, the predetermined minimum number is assumed to be 8. Should therefore less than 8 width recognition pulses be found during the count of a width signal, it may then be assumed that we are dealing with a scanned rest position line, as predetermined, which means an interval is being recognized. The width counter 22 as well as the other accumulator and counting circuits connected therewith are usually composed of five stages. It is therefore possible to count or accumulate a maximum of $2^5$ that is 32 width recognition pulses. The range which is still available between 8 and 32 pulses may then be subdivided corresponding to the recording width used in actual practice.

It frequently occurs in practice that the bar graph record will show interruptions within a recording interval which may be due to the stoppage or interruption of the recording apparatus or may be due to faults in the paper, and the like.

These interruptions would tend to falsify the results which are printed out. The release of the recording period as accumulated in the storage circuit 26 to a printing storage circuit 28 corresponding to the scanned recording width will occur therefore only after a given predetermined time, (e.g. after one recording hour) and only when the incoming recording recognition signals have been recognized with certainty as corresponding to one and the same recording width.

In order to attain the above, a first maximum width accumulator or storage circuit 23 is connected in circuit with the width counter 22 which acts to determine the maximum recording width within a recording interval. The width recognition pulse sequences are continuously counted in the width counter 22 comprising a five-stage dual counter and are again released through each arriving periodic timing impulse. The counter position therefore changes with each change of the scanned recording width. The maximum width accumulator or storage circuit 23 simultaneously activated, is generally restored only after the termination of a continuous recording interval. During this interval it will accumulate the largest recording width occurring therein. Its contents is continuously compared with the counting value of the width counter 22 over an equivalence circuit. Thus, pulses derived from an interruption in the record are automatically suppressed since no equivalence with the contents of the maximum width accumulator can be attained.

It would now be possible, on the basis of the width recognition impulses accumulated in the maximum width storage circuit 23 to coordinate with considerably certainty the timing pulses which have accumulated after a given test period, (for instance, one recording hour) in the recording period prestorage 26 with the print or accumulator 28 corresponding to the scanned recording width. Since, however, in practice generally, each of the individual recording widths is recorded with a certain tolerance, it is still necessary, since one and the same width may occur several times within a section of the recording disc under evaluation and thereby within different tolerance ranges, that the width recognition pulses of each of the recording widths be stored after their first occurrence and be compared, and these stored record widths be compared with the widths which have been recognized later. The evaluation system includes three width accumulators 25.1, 25.2, 25.3, which are adapted to receive the maximum recording width as recognized by the maximum width accumulator 23. It will be recognized, of course, that at the beginning of the scan no value has accumulated in any of the width accumulators. The first recognized maximum recording width is therefore introduced into the width accumulator assigned thereto, as a constant value, which may then be compared with the widths subsequently recognized.

This comparison, which makes possible a definite indication of the coordination of the recording period accumulated in the recording period prestorage 26, will be carried out, triggered by a release pulse from the recording period prestorage 26 after a given stored number of timing pulses, by the width control circuit 24 in accordance with a predetermined program. For this purpose, a second maximum width accumulator circuit 23' is connected in parallel with the first maximum width storage circuit 23, and preselected in such a manner that it contains a counting result which is smaller by 1 as compared to that of the first one. The stored contents of the width accumulator will now be compared with the stored value of the second maximum width storage circuit by way of three equivalence circuits coordinated with the storage circuits. The width control circuit then causes the result output of the second maximum width storage circuit 23' to be increased by one. After a comparison with the width storage contents having again been made, the result out storage of the second maximum width storage circuit 23' in accordance with the predetermined program is then increased again by one and compared with the width storage content. Thus the scanned recording width is compared with a suitably wide tolerance range before it is transmitted into one of the width storage circuits 25. Those recording widths which still come within the comparison tolerance range are now declared to be identical with the recording width stored in the width accumulator 25. An interrogation pulse is, of course, delivered to the recording period preaccumulator 26 when the comparison between the contents of the second maximum width storage 23' and one of the three constant widths already stored has been successful, and the transmission of the recording period is initiated into one of the printing storage circuits 28. At the same time, the comparison process is interrupted through an impulse derived from one of the width selector circuits 29.

The recording period preaccumulator 26 essentially comprises a multistage forward and backward counting dual counter which, when it attains its maximum possible storage value, produces a release pulse for the width control 24. After the width selection of the timing impulses stored in the recording period preaccumulator 26 has taken place the interrogation pulse, derived from one of the width accumulators, will cause the recording period preaccumulator 26 to be counted out through oscillator impulses and the accumulated value to be taken over by one of the printing storage circuits 28 as selected.

However, a release pulse is also obtained, whenever at the end of a recording interval, the recording period preaccumulator 26 is not completely filled, that is, when a comparatively small recording interval has been scanned. Should, however, a recording interval be scanned, which is larger than the recording period which may be stored in the recording period preaccumulator 26, the width selection which has already occurred will be maintained during the entire recording interval. That is to say, no further release pulse will be delivered to the width control 24, since it may be assumed that the scanned recording width will have been definitely recognized within the first recording hour (the maximum storage value of the recording period preaccumulator). the recording At the end of the scanning period (for a recording disc producing a concentric graph record after one revolution), recording periods of the various recording widths are added together in the printing accumulators 28 and on the basis of a decimal base code. The digital printer 30 interrogates the accumulator 28 and prints out the results in the form of three columns. The number thus printed out indicates recording RECORDING period in minutes. In order therefore to be able to make a determination as to which result is coordinated to which recording width, there is disposed in accordance with FIGS. 4 and 7 a printer selector 31 between the printer 30 and the printer accumulators 28. The printer selector 31 therefore is in a position, based on the maximum recording widths accumulated in the width accumulators 25 to provide a relative coordination between recording width and printing column on the paper tape in such a way that for instance the recording period of the widest recording width is printed on the extreme right and that corresponding to the smallest recording width is printed on the extreme left of the tape.

The bar graph may, as already explained, also be used for the determination of working periods. It may be required that interruptions, that is working pauses, which remain predetermined fixed limits, are added to the working period (recording time).

For the purpose of recognizing these pauses (intervals) an interval preaccumulator 27 is provided which similar to the recording period preaccumulator 26 comprises a multistage for forward and backward counting dual counter. In another form, the interval preaccumulator 27 is preselected so that, when a recording interval is being scanned, it will take in only that many timing pulses as correspond to the predetermined intermission interval, which are still recognized as part of the working period. As this limit pulse number is attained, the interval preaccumulator 27 is again deactivated and remains in this condition until a new intermission interval is recognized in the recording period recognition circuit 21.

The coordination of the intervals with the recording period, as already accumulated in the corresponding printing accumulators 28, takes place over the interruption interval selector circuit 32 and over the interruption control accumulators 33.1, 33.2, and 33.3, corresponding to the width accumulators 25.1, 25.2, and 25.3. These interval control accumulators 33 are essentially comprised of a double-stage shift register. As already explained, after a scanned recording width has been recognized as a recording pause, or in case of a longer recording interval, as for instance after one recording hour, a release pulse for the width control circuit 24 is provided by the recording period preaccumulator 26. In correspondence with the scanned recording width, one of the width accumulators 25 provides as interrogation impulse to the recording period preaccumulator 26 after the comparison with a second maximum width accumulator 23 has been successful. The interrogating pulse will effect a transmission of the recording period as stored in the recording period preaccumulator 26 to one of the printing storage circuits 28. This interrogating pulse causes a marker pulse 1 to be transmitted into a width accumulator 25 which is associated with the corresponding interval control accumulator 33, the other interval control storage circuits 33 simultaneously being restored over the interval selector 32. Should the same width follow the recording width just scanned, another interrogation pulse from the same width accumulator 25 will be transmitted to the recording period preaccumulator 26 after a recording hour or after the termination of the recording interval. This impulse acts to transfer a marking pulse 2 to an interval control accumulator 33 coordinated with the width storage circuit already marked with marking pulse 1. As a result, the far edge of the impulse interrogating the recording period preaccumulator 26 is thereby applied as an interrogating pulse to the interval preaccumulator 27. The transfer of the timing pulses stored in the interval preaccumulator 27 to one of the printing storage circuits 28 may occur, only provided that an interval determination is desired when the pulses stored in the recording period preaccumulator 26 has have entered the corresponding printing accumulator. The interrogating pulse for the interval therefore is delayed in a delay circuit and will give rise to an interrogation only when the interrogation process of the recording period preaccumulator 26 has been terminated.

As previously mentioned in a discussion of FIG. 8, a simplified electronic evaluation circuit may be used, as proposed in the second solution in accordance with the invention, for width recognition of the signals derived from the optical scanning head whenever the following conditions have been fulfilled:

1. The bar graph record must represent an evenly wide recording band, due to the use of a graph recording device which is wholly or partly subject to a positive drive and which does not permit of the occurrence of substantial of interruption which may cause an erroneous result.

2. The bar graph record must have a relatively narrow width tolerance, and this tolerance must show a predetermined guaranteed constancy over longer recording periods.

3. The tolerance ranges of the various recording widths must not be allowed to overlap.

The simplified evaluation circuit as shown in FIG. 8 permits the evaluation of two different recording widths. The circuit, however, if the above-named conditions are fulfilled by the recording process, may in principle also be enlarged to take in a plurality of recording widths. The function of this circuit may best be understood with reference to the three sections *a*, *b*, and *c* of the impulse diagram of FIG. 9. In the diagram, the section *a* indicates the evaluation of width signals of the larger recording width, the section *b* shows width signals as they could occur for instance during the scan of the at-rest-condition and the section *c* indicates the evaluation of width signals of the smaller recording width.

The impulses derived from the optical scanning head, the width signals and the timing pulses are applied to the coupling circuit 20, in a known manner, in which they are further processed, that is amplified and shaped. An essential difference in respect to the previously discussed evaluation system, shown in FIG. 7, is to be found in that instead of the timing impulses, the width signals themselves which have a predetermined phase relationship to the timing impulses are used in a special manner for counting the recording period. For the purpose of width recognition therefore, a time related tolerance range is provided for each of the recording widths, into which the far edge of each width signal has to fit. As a result this circuit will be able to recognize the signal as such and thereby is able to produce recording or driving period counting impulse, i.e. one pulse, for each recording minute as already explained hereinabove.

Each of the width signals, derived from the coupling circuit 20, is simultaneously applied to the four timing circuits 34, 35, 36 and 37 of which two each are coordinated with a given recording width. The timing circuit 34 may be triggered to revert to its initial state after .7 milliseconds, and the timing circuit 35 after 1.4 milliseconds. Similarly, the timing circuits 36 and 37 provide a positive potential pulse after 1.7, respectively 2.4 milliseconds. The respective difference between the two pulse periods of the timing circuits 34 and 35 or 36 and 37 comprises the time tolerance range to which the still permissible width signals are to be limited.

If it is desired to evaluate the width impulses of the larger recording width, as shown in the impulse diagram FIG. 9, section *a*, the width recognition circuit (this includes circuits 34, 35, and 38 as well as 36, 37 and 39) operate as follows:

1. The timing circuits 34 through 37 are pulsed by the positive near edge of the width signals; at the same time the comparison circuits 38 and 39 are prepared for a switchover for the duration of the width signals.

2. A positive potential pulse occurs after .7 milliseconds at the output terminal D of the timing circuit 34 which triggers the comparison circuit 38 and causes the output terminal H to become conductive.

3. After another .7 milliseconds, the width signal is still being applied in full strength without change to the comparison circuit 38, a positive potential pulse is produced by the timing circuit 35 at its output terminal E which serves to trigger off the comparison circuit 38 and to block its output terminal H.

4. After another .3 milliseconds, a positive potential pulse is produced at output point F of the timing circuit 36 which has a switching period of 1.7 milliseconds, also serving to trigger the comparison circuit 39 and to render conductive its output point I, the circuit 39 having also been prepared by the width signal.

5. Since after a few milliseconds, the preconditioning potential at the comparison circuit 39 will decrease due to disappearance of the width signal at I, the positive potential pulse appearing at output point G of the timing circuit 37 after altogether 2.4 milliseconds, will not be able to effect a restoration of the comparison circuit 39. The output point I accordingly, remains, conductive, which means, that the width has been recognized and this coordination remains intact as long as the positively increasing near edge of the timing impulse, derived at the outpoint A of the coupling circuit 20 and which is applied to the two comparison circuits 38 and 39 will store the initial condition after each width signal.

A preaccumulator 40 and 41 is respectively connected in circuit with the width recognition circuits, that is, the comparison circuits 38 and 39 for the purpose of preconditioning the printing accumulators 42 and 43, in circuit therewith, for the reception of counting pulses.

It is possible, that at the beginning of a scan of a new record width, due to defective recording both recording widths may be recognized one after the other. It may also occur that in the case of brief interruptions in the record, the other (smaller) recording width may be recognized and would therefore also be counted. It is therefore a further object of the accumulators 40 and 41 to suppress some of the initial pulses at the beginning of the scan of each new recording width. An assurance is thus provided that only after a number of sequential and equal width impulses a selection of the printer for the counting pulses occurs, and that this selection can not be changed through individual error pulses which accidentally correspond to the width impulses of the other recording widths. The initial suppression of a few width signals may well lie within the permissible evaluation tolerance ranges as related to the entire evaluation range (one record disc revolution).

Due to the triggering of timing circuits 34 through 37 and of the comparison circuit 38 and 39 connected therewith, the width signal, at the same time, is also applied to the inverting stage 44. At the output point C of the inverting stage 44, a negative signal is produced for the duration of the respective width signals. The two preaccumulators 40 and 41 in addition to comparison circuits 38 and 39, are also connected with the inverting stage 44. Thus, when, for instance, the comparison circuit 39 has recognized the scanned width (refer to FIG. 9, section a) and has pulsed the preaccumulator 40 over connection I, the far edge of the negative width signal at C will be counted as a positive counting pulse in the marked preaccumulator 40. After a few counting steps, the printing accumulator 42 is triggered through the preaccumulator associated therewith, while the preaccumulator 41 is restored, since both of the preaccumulators are coupled to one another.

The recording or driving period counting pulses, which are to be counted as a measure for the recording minutes in the printing storage, are provided by the monostable trigger circuit 45. It is necessary therefore, that the trigger circuit 45, first be prepulsed by means of a positive signal at the output points H OR I of the comparison circuits 38 or 39 over the OR coupling circuit 46. As long as this positive signal is applied, the far edge of the negative width signal at point C will be in a position to effect a reversal of the trigger circuit 45. The transfer of the driving period counting pulse produced by the trigger circuit 45 to one of the printing storage circuits 42 or 43 will take place only, as already mentioned, when the respective printing storage has been prepulsed from the prestorage stage coordinated therewith. This will lead to a loss of several recording or driving period counting pulses at the beginning of the scan of a new recording width as a comparison between the record M and pulsing records K and L will show. These pulses, however, will be added again, when another recording width follows, until such time as the prestorage of the other recording width cancels the previous printer pulsing.

Figure 9:
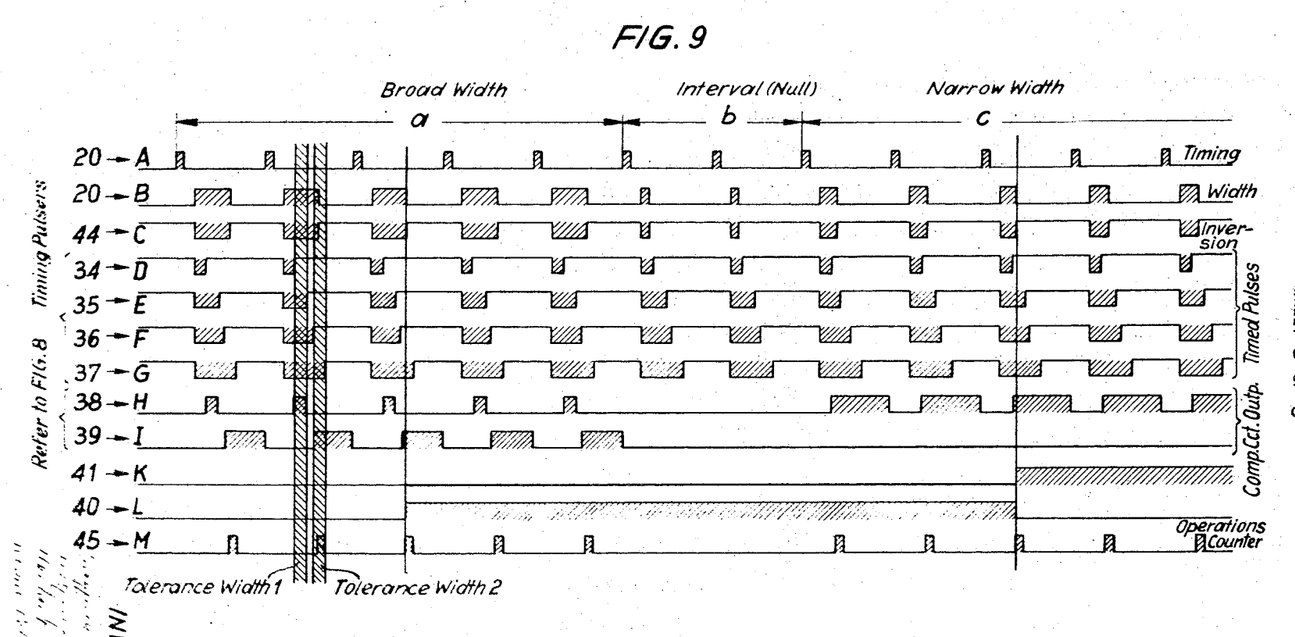
FIG. 9 is a timing diagram for the signal processing in accordance with the block schematic diagram of FIG. 8 (pulse scale: 1 cm. = 2 msec.)

Section b of FIG. 9 illustrates the graph B of a width signal which, for instance, could have been produced by the rest position line, or have been an error signal through a scratch or irregularity of the plastic surface of the record disc. The far edge of this signal, accordingly, lies outside of the tolerance ranges predetermined by the timing circuits 34 and 35, or 36 and 37. thus, such a signal is not in a position to produce any potential increases at the output points H or I of the comparison circuits 38 and 39, which is to say the signal will not be brought out or recognized as having been produced by an admissible recording width.

Section c of FIG. 9 illustrates the graph B of the width signal which has been derived from the scan of the narrow recording width. The far edge of this signal falls within the time range as predetermined by the timing circuits 34 and 35. In other words, when the positive potential pulse appears at the output point E of the timing circuit 35, the potential of the width signal at the comparison circuit 38 has already decreased, so that the positive potential pulse derived from the timing circuit 35 is no longer capable of restoring the comparison circuit 38 to its original condition. Under these circumstances, the output point H of the comparison circuit 38, which had become conductive through the application thereto of the positive far edge of the timing circuit 34, remains conductive. Since the width signal potential at this point in time has already fallen off, the far edges of the timing circuits 38 and 37 cannot effect any switching functions with respect to the comparison circuit 39. The restoration of the comparison circuit 39 is brought about again by means of the timing pulse which follows the width signal. The further signal processing takes place, as already explained, through the prestorage circuit 41 which had been prepulsed by means of the signal at the output point H and counted out by means of far edge of the negative width signal. The prestorage circuit 41, as soon as it has received its full count will prepulse the printing storage circuit 43, which is thus made receptive for the recording or driving period pulses produced by the trigger circuit 45. At the end of the evaluation, that is, after a full revolution of the record disc, (24 recording hours equal 1440 minutes for 24-hour discs, or 1560 minutes for a 26-hour disc) the revolution counter 47 which is arranged to count the recording minutes in the form of timing impulses, provides a starting signal for the printer 48, thus initiating the interrogation of the printing storage circuits 42 and 43. At the same time, the motor driving the recording disc will be stopped and the prestorage circuits 40 and 41 will be restored.

It is of course possible to further simplify the circuit by providing prestorage circuits 40 and 41 each of which may consist of a single trigger circuit which are capable, at the first appearance of a potential pulse at I or H of prepulsing the printing circuit connected thereto the same time, one preaccumulator restores the other, provided that there is available at the beginning of the bar graph a vertical line for the full length of the bar. It is however, useful to provide at least the prestorage circuit for the smaller or narrower record width in the form of a multistage circuit, since it is much more probable, that during the scan of the wider recording width the taller width may be erroneously recognized rather than the other way around.

is desired that not only the driving periods as such, but also the overall working period of each driver is to be automatically determined, it becomes necessary, if the driver is allowed driving interruptions or pauses of a predetermined fixed minute value as part of the working period, that these interval minute or pause minutes are determined in a recording, i.e. driving period accumulating printing storage circuit, that is that they are added to the driving period as such. The purpose of this interval determination has already been explained in connection with the discussion of the first proposed solution in accordance with the invention hereinabove.

The block diagram of FIG. 10 is an illustration of the arrangement in accordance with the width recognition, as explained in connection with the second proposed solution, to which the interval or pause recognition has been added. This enlargement of the evaluation circuit as well as its operation will be explained with reference to the pulse graph shown in FIG. 11.

The scanning of the wider recording width is shown in section a of the pulse graph (timing period 1). As already explained, in addition to the timing pulses as to A, negative width signals will be produced at point C of the inversion stage 44, the positive far edges of which serve to pulse the trigger stage 45 in order to produce recording or driving period counting impulses at point N (minute impulses). THe pulses thus obtained, are counted into the printing storage circuits 42 or 43 which have been prepared in a known manner by means of the prestorage circuits 40 or 41. The printing storage circuit 42 has been prepulsed at the beginning of this operation over point L (time period 1 in FIG. 11).

A further trigger stage 49 is connected in parallel to the printing storage circuits 42 or 43 for the purpose of recognition of driving period interruptions (pauses or intervals). The potential at the output point P of trigger stage 49 will be lowered alternately through each of the driving period counting pulses as at N and is again raised through each of the subsequent timing pulses as at A. During this operation, the trigger circuit 49, at the appearance of a positive potential pulse at the output points K or L of the prestorage circuits 40 or 41 over the OR stage 50, will have brought the timing circuit 51 as well as the switching circuit 52 into a predetermined output condition.

Figure 11:
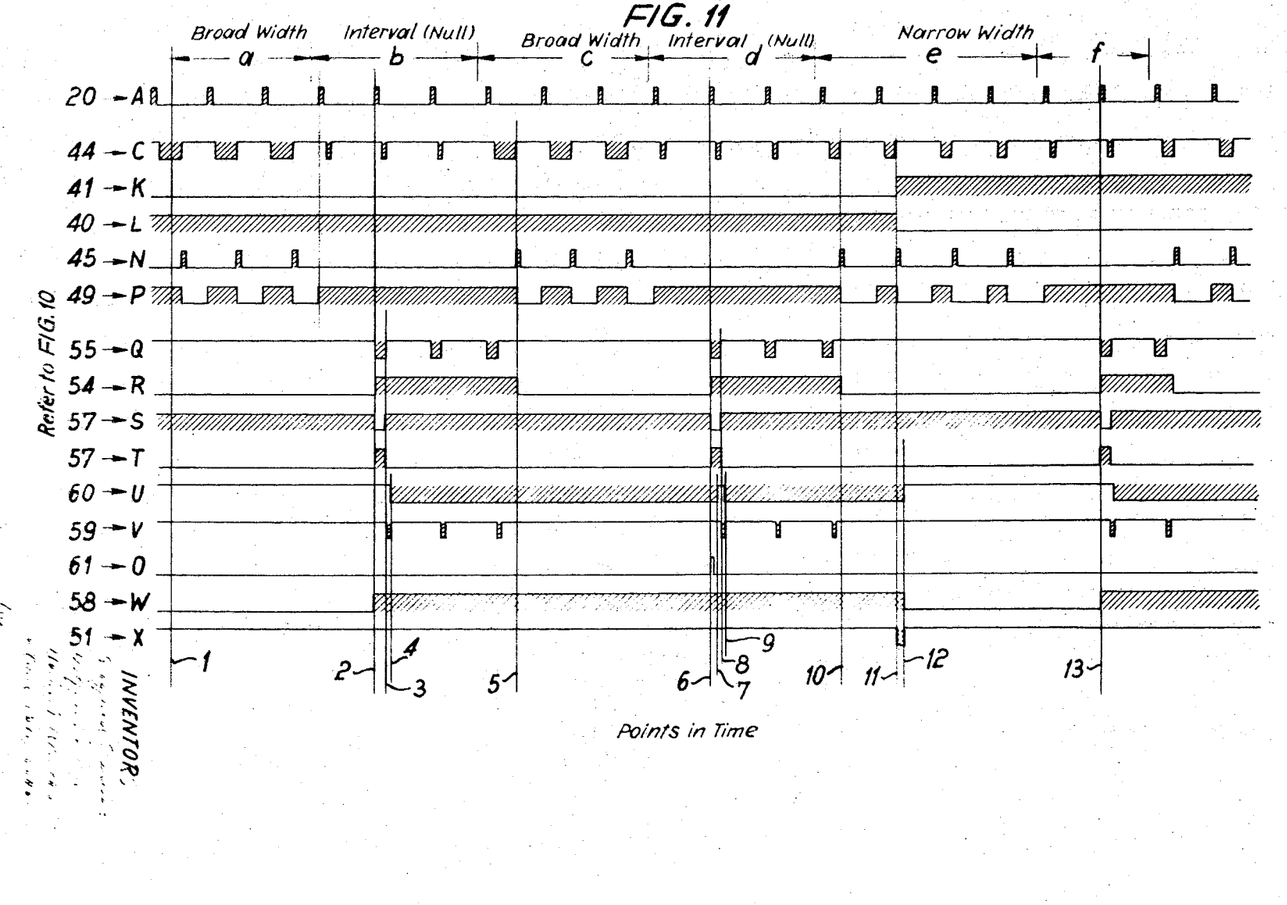
FIG. 11 is a time diagram illustrating the signal processing for recognition of recording pauses in accordance with the showing of FIG. 10.

In section *b* of FIG. 11, the above scanning situation is followed by a driving interruption, wherein only the rest position of the recording disc is scanned by narrow negative width signals at C. the driving period counting pulses at N do not appear, since the far edges of the width signals produced by the by rest position line fall outside of the tolerance ranges predetermined by the timing circuits 34, 35 and 36, 37. the potential at output point P of the trigger stage 49 is maintained. Thus, the first timing impulse following the width signal of the rest position line, causes a reversal of the control circuit 54 by way of the gating circuit 53. The control circuit 54 will have been maintained in a blocked condition during the driving period recognition by means of counting pulses as at N. The result is that the potential at the output point R of this stage is raised and a timing circuit 55 is pulsed into action. The positive potential pulse on the one hand triggers the circuit 57 which serves to pulse the interval storage circuit 56 in such a way that the interval storage circuit is prepared for countout over point T. The clearing circuit 58 is also pulsed and thereby releases the blocking of the interval storage circuit 56 due to a negative potential at the output point W of the clearing circuit 58. At the same time, the potential at the output 5 of the pulsing circuit 57 will be lowered.

The interval storage circuit 56 in a binary counter designed for forward and backward counting taking the form of a five-stage circuit, in order to make it possible that intervals within half an hour may be included and recognized selectively.

After some time, which must be sufficient for the entire counting contents of the interval storage circuit to be counted out, the pulsing condition of the pulsing circuit 57 is again reversed through the positive far edge of the pulse provided by the timing circuit 55. At the same time a counting impulse, produced in the monostable trigger circuit 59, is again applied to the interval storage circuit 56 over V which has been prepared for forward counting as at S (time period 3). The far edge of this interval counting pulse serves to pulse the first stage of the interval storage 56, with the result that the equivalence circuit 60 which is connected with each stage of the interval storage circuit 56 recognized a counting value in the interval storage circuit 56. The equivalence circuit 60 thus supplies a positive preparatory control potential over U to timing generator 61, causing a count out of the interval storage content, and to a inverting stage which has not been shown (timing period 4). Since the pulsing of the interval storage circuit 56 is maintained over S for the subsequent timing pulses, the interval counting pulses as produced in the trigger circuit 59 continue to be applied to the interval storage circuit 56.

If now, the wider recording width is to be scanned (FIG. 11, section *c* ) the first driving period impulse appearing at output point N of the trigger circuit 45, serves to pulse the trigger circuit 49 with its near edge, thereby blocking the gate 53, whereby the production of interval counting pulses will be interrupted. At the same time, the control circuit 54 will also be restored (time period 5).

Section *d* in FIG. 11 illustrates that the photoelectric apparatus again acts to scan the null or rest position line. The timing pulse following the first width signal of the rest position line, as already described, triggers the control stage 54 and also pulses the timing circuit 55. The pulsed condition of the interval storage circuit 56 will again be changed under the control of the positive potential pulse at the output point R. Thus, a positive potential will occur at the output point T of the marking stage 57 which serves to prepare the interval storage circuit for the countout. At the same time, the positive potential pulse at R, pulses the timing generator 61, which, within the marked period at the output point T of the marking stage 57 made available by the timing circuit 55, counts out the interval storage 56. The contents of the interval storage 56 (graph 0) is counted into the printing storage circuit 42 prepulsed therefor by way of the OR stage 62. As soon as the equivalence circuit 60 recognizes the counting contents for the at rest condition in the interval storage circuit 56, the decrease of the control potential (timing period 7) causes the timing generator 61 to be stopped over connection U. Subsequently, the timing circuit is stored, changes by means of the positive potential pulse appearing at its output point Q the marked condition of the storage circuit 56 and thereby activates the monostable trigger circuit 59 serving to produce the first interval counting impulse thereby (timing period 8). The positive far edge of this interval counting impulse triggers the first stage of the interval storage circuit 56. The equivalence circuit 60 responds to a count contents other than zero and connects the timing generator 51 to its control potential over U (timing period 9).

As in section *b* of FIG. 11, there follow further minutes of intermission, until in section *e*, the narrower recording width is recognized, and the far edge of the negative width signal at C, triggers a driving period counting impulse at output point N which interrupts the interval recognition, that is, causes the blocking of gate circuit 53 and restores the control circuit 54 (time period 10). This driving period impulse, however, may not enter the printing storage circuit, since prepulsing of this is necessary by means of the prestorage circuit 41. The far edge of the following negative width impulse causes a trigger pulse to be applied at the output point K of the prestorage circuit 41, while the prepulsing of the prestorage 40 of the printing storage 42 is canceled. Simultaneously, the timing circuit 51 is pulsed by way of the OR stage 50 (timing period 11). The impulse appearing at the output point X of the timing circuit 51 with its positive far edge pulses the clearing stage 58. Clearing circuit 58 serves to cancel through the negative potential at its output point W, the content of the interval storage circuit 56, which had been counted there into after the last determined driving period (section *c*). The equivalence circuit 60 also recognizes the at-rest count of the interval storage circuit 56, and interrupts the control potential connection of the timing generator 61 at the outpout point U (timing period 12).

In section *f*, during the (pause) interval following within the range of the smaller recording width, as already explained, for section *b*, the first timing pulse triggers the interval recognition and the interval count (time period 13). At the beginning of the second following (pause) interval, analogous to that of section *d*, time period 6, at the latest, however, at the end of a continuous driving interval or during a change in drivers, the counting value of the interval storage circuit 56 is again counted out into the correspondingly prepulsed printing storage circuit.

As already mentioned, the pause intervals, which are to be counted as part of the working period, are made available to the interval storage circuit 56 through preselection. For this purpose, the individual stages of the interval storage 56 may be selected by means of a manually operable selector switch 63, which selectively connects the two numberical position of each of the stages with an equivalence circuit 64. As the minute value which has been selected in code through the selector switch during the scan of the at-rest position line is attained in the interval storage circuit 56, the equivalence circuit 64 pulses the trigger stage 65. The output pulse of the stage 65 serves to trigger the clearing stage 58, which clears the interval storage circuit 56. The storage contents, therefore, is no longer recognized as an admissible interval whenever the selected minute value is exceeded and accordingly is not transferred into either of the printing storage circuits 42 or 43.

After a record-disc revolution as shown in connection with the evaluation without interval recognition, the signal produced by the revolution counter 47 serves to clear the prestorage circuits 40 and 41 as well as to restore the pulsing circuit 57, the clearing stage 58 and the selector switch 52 into a predetermined starting position. At the same time, an interrogation of the printing storage circuits 42 and 43 takes place through the medium of printer 48 under the control of a starting signal derived from revolution counter 47.

After the printout of the counting value of the printer storage, the printer 48 provides a record which shows the recording periods in the form of the driving periods as such, as driving minutes. If the intervals have been included, the sum of the working periods will be shown in digital form for one or more drivers as working minutes within, for instance, 24 hours, when the recording disc to be evaluated had been provided for such a period.

The decisive advantage of the automatic record evaluation is to be found, on the one hand, in the extraordinarily fast evaluation speed, as well as in the absolute exclusion of any subjective errors. In addition, the printed record may serve as a direct basis for purpose of salary accounting.

In a further development of the invention, it may be visualized that the minute values as provided by the evaluation apparatus may be remotely transmitted and centrally evaluated, or may be directly introduced into a card puncher for a permanent data record.

While the invention has been set forth herein with respect to certain embodiments thereof, many modifications and changes will immediately occur to those skilled in the art. Accordingly, by the appended claims, we intend to cover all such modification and changes as fall within the true spirit and scope of the invention.

We claim:

1. Method for the automatic evaluation of a bar graph record extending along a time line and having a plurality of bar widths perpendicular to said time line, each of said bar width representing a determined operating condition, comprising in combination, the step of scanning said bar graph in a direction perpendicular to said time line to generate width signals, each width signal comprising a pulse having a pulse width corresponding to the bar width of the portion of the bar graph record being scanned; counting the number of width signals corresponding to each predetermined bar width occurring during said recording period, thus furnishing a plurality of width counts; and generating visual output signals signifying each of said width counts.

2. A method as set forth in claim 1, further comprising the step of generating timing signals for timing of the recording period in synchronism with said scanning of said bar graph, said timing signals occurring at a first frequency.

3. A method as set forth in claim 2, wherein said width signals are time duration pulses, each of said time duration pulses having a pulse width corresponding to the width of the bar graph portion being scanned.

4. A method as set forth in claim 3, wherein said step of counting the number of width signals corresponding to each predetermined bar width occurring during a recording period comprises the step of measuring the pulse width of each of said time duration pulses.

5. A method as set forth in claim 4, wherein said step of measuring the pulse width of each of said time duration pulses comprises generating counting pulses at a second frequency, higher than said first frequency, for the duration of each of said time duration pulses, and counting the counting pulses associated with each time duration pulse.

6. The method according to claim 5, wherein successive bar graph portions are interrupted by intervals of recording pauses corresponding to nonoperating periods, and said intervals are measured in respect to their width by means of said timing pulses when the counting pulses for a time duration pulse are less than a predetermined minimum number.

7. Arrangement for determining the time duration during a recording period of each of a plurality of operating conditions comprising, in combination, a record carrier; a bar graph record on said record carrier, said bar graph record extending along a time line and having a predetermined bar width perpendicular to said time line for each of said operating conditions; means for scanning said bar graph record in a direction perpendicular to the direction of said time line, said scanning means being adapted to furnish width signals, each width signal having a width corresponding to the bar width of the portion of the bar graph record being scanned; accumulator means for counting the number of width signals corresponding to each predetermined bar width occurring during the recording period, thus furnishing a plurality of width counts; and readout means for furnishing visual output signals signifying each of said width counts following said recording period.

8. The apparatus according to claim 7, further including means for producing timing pulses for timing the period of recording operatively connected to said scanning means.

9. The apparatus according to claim 8, further including means for providing time duration pulse tolerance ranges for at least two bar graph recording widths; means for applying the time duration pulses to said tolerance range means; means for counting the total recording period as defined by and in response to the output of said tolerance range means; and means for furnishing pulses occurring only within said tolerance ranges to said accumulator means.

10. The apparatus according to claim 9, further including means for recognizing a recording interruption interval in response to inoperativeness of said recording period counting means, means for counting the duration of said interval in response to the output of said interval recognition means, and means for connecting said readingout means to readout said intervals in response to said last named counting means.

11. Apparatus according to claim 10, further including a manually operated switch for deactivating said interval recognition means.

12. The apparatus according to claim 9, further including means for counting said timing pulses, and mans for activating said readout means in response to a given number of said timing pulses.

13. An arrangement as set forth in claim 8, wherein said accumulator means comprise a plurality of accumulator units, each responsive to an accumulator input signal, each for furnishing a width count signifying the number of width pulses corresponding to a predetermined bar width received during said recording period; monitoring means for monitoring the width of said width pulses and selecting the corresponding accumulator as a function thereof; and means for furnishing said timing pulses to the selected accumulator unit to constitute accumulator input signals.

14. An arrangement as set forth in claim 13, wherein said width pulses occur at a first frequency, and wherein said monitoring means comprise means for generating second frequency pulses, said second frequency being higher than said first frequency, the number of said second frequency pulses corresponding to the pulse width of said width pulses; and time duration counting means for counting the number of said second frequency pulses.

15. An arrangement as set forth in claim 14, further comprising an interval preaccumulator; means for generating preaccumulator input signals in dependence upon time duration counting signals signifying counts of second frequency pulses less than predetermined minimum.

16. The apparatus according to claim 14, further including an additional accumulator circuit for storing second frequency pulses corresponding to a given maximum graph recording width, and means for comprising the maximum width storage with the pulse output of said time duration counting means, said readingout means being controlled thereby.